United States Patent
Vitins et al.

(10) Patent No.: US 11,251,483 B2
(45) Date of Patent: Feb. 15, 2022

(54) METHOD OF PREPARING AN ELECTROCHEMICAL CELL

(71) Applicant: QINETIQ LIMITED, Farnborough (GB)

(72) Inventors: Girts Vitins, Gosport (GB); Gary Owen Mepsted, Southampton (GB)

(73) Assignee: QinetiQ Limited, Hampshire (GB)

( * ) Notice: Subject to any disclaimer, the term of this patent is extended or adjusted under 35 U.S.C. 154(b) by 327 days.

(21) Appl. No.: 16/305,650

(22) PCT Filed: Jun. 1, 2017

(86) PCT No.: PCT/EP2017/063397
§ 371 (c)(1),
(2) Date: Nov. 29, 2018

(87) PCT Pub. No.: WO2017/207735
PCT Pub. Date: Dec. 7, 2017

(65) Prior Publication Data
US 2020/0335735 A1 Oct. 22, 2020

(30) Foreign Application Priority Data
Jun. 2, 2016 (GB) ...................................... 1609686

(51) Int. Cl.
*H01M 50/00* (2021.01)
*H01M 50/116* (2021.01)
(Continued)

(52) U.S. Cl.
CPC .......... *H01M 50/116* (2021.01); *H01G 11/32* (2013.01); *H01G 11/50* (2013.01);
(Continued)

(58) Field of Classification Search
CPC ........ H01G 11/78; H01G 11/12; H01G 11/32; H01M 2/0267; H01M 2220/30; H01M 2/06; H01M 10/0459
See application file for complete search history.

(56) References Cited

U.S. PATENT DOCUMENTS

| 6,423,449 | B1 * | 7/2002 | Hong | ................ | H01M 10/0431 |
| | | | | | 429/231.95 |
| 2005/0191545 | A1 | 9/2005 | Bowles et al. | | |

(Continued)

FOREIGN PATENT DOCUMENTS

| EP | 0 390 557 | 10/1990 |
| EP | 1 440 487 | 8/2007 |

(Continued)

*Primary Examiner* — Cynthia H Kelly
*Assistant Examiner* — Monique M Wills
(74) *Attorney, Agent, or Firm* — McDonnell Boehnen Hulbert & Berghoff LLP

(57) ABSTRACT

A thin flexible conformable electrochemical cell for powering a wearable electrical device comprising an inner electrode having an active electrode face of one charge and an outer electrode having an active electrode face of the opposite charge separated by a separator, wherein said separator comprises an electrolyte layer as a single continuous layer folded around the inner electrode, and wherein the cell has a single continuous flexible coating material folded around the separator and the inner electrode so as to offer protection for the cell, and wherein the coating material is sealable so as define access to the cell for electrode contacts for connection with the electrical device, and so as to offer avoidance of the cell short circuiting in use. Also provided are methods for cell preparation.

9 Claims, 3 Drawing Sheets

(51) Int. Cl.
*H01G 11/32* (2013.01)
*H01G 11/50* (2013.01)
*H01G 11/52* (2013.01)
*H01G 11/84* (2013.01)
*H01M 4/66* (2006.01)
*H01M 6/16* (2006.01)
*H01M 10/0525* (2010.01)
*H01M 10/0583* (2010.01)
*H01M 4/02* (2006.01)

(52) U.S. Cl.
CPC ............ *H01G 11/52* (2013.01); *H01G 11/84* (2013.01); *H01M 4/661* (2013.01); *H01M 6/16* (2013.01); *H01M 10/0525* (2013.01); *H01M 10/0583* (2013.01); *H01M 2004/027* (2013.01); *H01M 2220/30* (2013.01)

(56) References Cited

U.S. PATENT DOCUMENTS

| | | |
|---|---|---|
| 2011/0236755 A1 | 9/2011 | Ogino et al. |
| 2014/0162108 A1* | 6/2014 | Visco ............... H01M 6/34 429/131 |
| 2015/0140452 A1 | 5/2015 | Park et al. |
| 2015/0333308 A1* | 11/2015 | Toyoda ............ H01M 50/461 429/144 |
| 2016/0149196 A1* | 5/2016 | Fan ............... H01M 10/4235 429/50 |

FOREIGN PATENT DOCUMENTS

| | | |
|---|---|---|
| EP | 2 534 713 | 9/2017 |
| JP | H11 121016 | 4/1999 |
| WO | WO 2005/045966 | 5/2005 |
| WO | WO 2015/125048 | 8/2015 |

* cited by examiner

| Parameters | Comparator Cell | Invention Cell | % improvement |
|---|---|---|---|
| Number of sealed margins | 4 | 3 | |
| Number of active electrode faces | 4 | 4 | |
| Single cell capacity/mAh  Voltage range 2.7-4.2 V, C/10 discharge rate | 76 | 76 | |
| Average Voltage/V | 3.68 | 3.68 | |
| Energy/mWh | 280 | 280 | |
| Cell dimensions (excluding tabs) | | | |
| Length/mm | 40 | 40 | |
| Width/mm | 35 | 35 | |
| Thickness/mm | 0.61 | 0.58 | |
| Weight [incl. tabs]/g | 1.81 | 1.55 | |
| Volume per cell body only/cm3 | 0.85 | 0.81 | |
| Specific energy/Wh/kg | 155 | 180 | 16 |
| Volumetric energy per cell body/Wh/L | 328 | 344 | 5 |

Figure 3

METHOD OF PREPARING AN ELECTROCHEMICAL CELL

FIELD OF THE INVENTION

The present invention relates to thin, lightweight, flexible/conformable/pliable electrochemical cells as well as wearable/lightweight devices incorporating them and their method of production. It particularly relates to electrochemical cells using lithium or lithium-ion based chemistries.

BACKGROUND OF THE INVENTION

In recent years, thin flat cells have been developed for space critical devices such as sensors and smart cards. For lightweight/wearable technology, preferred power sources include "soft pack" or pouch cells, which are thin and flexible and can attain high energy densities. Aqueous chemistry cells have flexibility but the chemistry means they provide much less energy and at lower voltage so are unsuitable for use in lightweight/wearable devices.

Solid-state Li-ion batteries are manufactured using expensive semi-conductor deposition techniques. The cells are very thin and flexible but capacities are much too low for use in wearable devices. Ultra-thin lithium rechargeable batteries for card-type applications can be exceptionally thin at about 0.05 mm and can be bent or twisted without damage. Although they contain lithium, they are composed of solid-state thin films including a non-liquid, ceramic electrolyte, so that there is no risk of toxic liquid electrolyte leaking if the hermetic seal is broken. Many conventional thin lithium-ion cells cannot be repeatedly flexed and/or are too thick or inflexible for many uses. Other problems with cells for wearable devices include the risk of short circuits.

EP 1 440 487 [Eveready] describes a flexible thin tabless battery prepared from a lithium foil sheet anode layer, an iron pyrite cathode, and a polypropylene membrane separator layer wherein the electrode contacts are integral with the housing or packaging material. Internal contacts for the electrodes are formed from a first and a second distinct sheet of laminate heat sealed together. Both electrode layers include an outer packaging function. Connection of the external contacts to a load with a continuous drain of 7 mAmps to 0.9 volts achieved a discharge efficiency of 66 and 72%.

EP 2 534 713 [QinetiQ] describes a thin electrochemical cell prepared from first and second laminated sheets, each sheet providing an outermost layer intended to provide a respective external face of the cell having an outer packaging function, a coextensive innermost conductive layer intended to act as the current collector layer with one conductive layer supporting an electrode layer and the other acting as the active electrode layer. Cells having sealed perimeter margins on 4 sides typically achieve discharge efficiencies in excess of 95%.

SUMMARY OF THE INVENTION

There is a need for further and improved lightweight power cells which can achieve high energy densities and high discharge efficiencies, have improved resistance to multiple flexing and offer further safety benefits including avoidance/minimised risks from short circuiting.

Accordingly, the present invention provides a thin electrochemical cell, powered devices and methods of manufacture therefore, as defined in the appended claims.

BRIEF DESCRIPTION OF THE DRAWINGS

Preferred embodiments of the present invention are described, by way of example only, with reference to the accompanying drawings in which:—

FIG. 3 shows a table of comparative data namely a comparison of a comparator power cell prepared from two separate/laminate sheets (4-sided seal) cell and a power cell according to the invention prepared from a single laminate sheet (3-sided seal).

DESCRIPTION OF THE INVENTION

Figure 1:
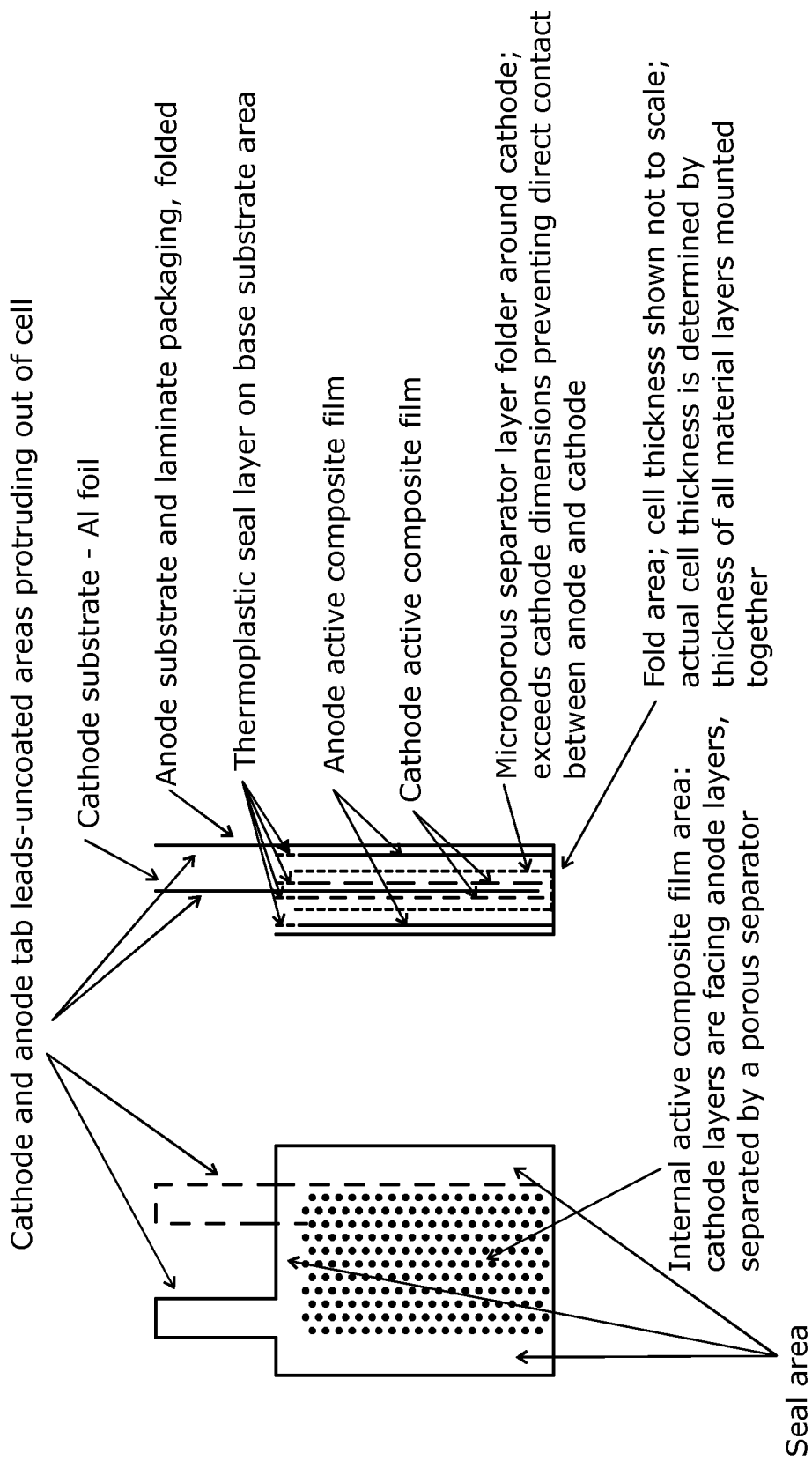
FIG. 1 is a representation of the flexible cell structure in a plan view and cross section of a bonded foil laminate cell with an internal anode with 3-sided seal margins.

According to the present invention only one electrode layer performs a packaging function. This is achieved by a single outer electrode layer and separator layer arranged as a fold or wrap around the opposite inner electrode so as to enclose it. The outer electrode face or coat layer (for example anode coat as in FIG. 1 and FIG. 2B) is directly deposited on the inner surface of the cell packaging. This electrode face or coat can be modified with a gap of an uncoated region 0.2-0.7 mm or 0.3-0.6 mm or 0.4-0.5 mm wide in the fold line in order to facilitate a lower fold radius and better compactness as well as a lower thickness of the cell in the fold area. The arrangement of the present invention therefore includes as part of the perimeter of the cell a folded edge region which thereby reduces the areas on the cell perimeter where shorting between opposite electrodes can typically take place. The new folded electrode layer arrangement has proven effective in eliminating short circuit risk, a problem which is relatively common in cell arrangements where both cathode and anode electrode layers have an external packaging function which leads to increased exposure to shorting at external perimeter edges. This new feature is particularly advantageous for wearable technology.

A particular benefit of the cells and devices of the present invention is that in principle any battery chemistry can be used. A further benefit of the invention is a reduced cost of materials and less waste given the simplicity of production and effective electrode production. With reduced layers, thin, flexible cells are enabled which can be repeatedly flexed and conformable, i.e. pliable, for example to a particular curved or other nonplanar shape.

Conventional materials and methods, for example as used in the preparation of the cells described in EP 2 534 713 can be used in the present invention. For re-chargeable cells, preferred cathode electrode material is selected from $LiCoO_2$, $LiNi_{0.8}Co_{0.15}Al_{0.05}O_2$, $LiMn_2O_4$, $LiFePO_4$ and their derivatives. Preferably the anode electrode material is selected from graphite, graphite-silicon composite, $Li_4Ti_5O_{12}$. For primary cells the preferred cathode materials include CFx, MnO2 and FeS2 and for anode material Lithium coated or rolled onto Cu substrate (laminate). Preferred electrode inks and coatings include LiCoO2 as the cathode active material and carbon (graphite) powder as the anode material.

A particular benefit of the improved cells of the present invention is a reduced footprint with increased energy per unit area. For example compared to a typical battery pack with at least two separate sealable material layers with four continuous sealed edges, the cell of the invention provides a single sealable layer in a fold/wrap round configuration offering a reduced sealing area which has achieved at least a doubling of energy per unit area.

Other benefits include, improved performance, in particular improved concentration/energy density/specific energy output including higher volumetric energy and capacity per total cell area with the same electrode capacity loading per unit area. Higher specific energy has been achieved (around 20% higher, for example an increase from 150-155 Wh/kg to 180 Wh/kg). With these benefits the discharge efficiencies of over 95% for standard lithium pouch cells are still maintained. Furthermore, the cells of the present invention offer good life cycles, especially with lower capacity range. For example a lithium-ion can be stored for 3-4 months.

Particularly useful in the present invention are laminated sheets having a protective layer on one face and a coterminous conductive layer on the other face that can act as a current collecting layer. The term "laminated sheet" is used herein broadly to cover an arrangement where layers are laminated together or otherwise attached together or built up on top of each other to form a final sheet product. In addition to the current collection function, the laminate needs to provide a moisture barrier and a protective function. The conductive layer may provide the only moisture barrier protection or other moisture barrier layers may be provided to prevent moisture loss (e.g. from aqueous batteries) or ingress (e.g. non-aqueous batteries).

The electrolyte layer in any cell separates a pair of positive and negative electrodes from contacting one another and comprises the electrolyte that interacts with the electrodes to create an electric current. The electrolyte layer in the cell according to the present invention may comprise a dry polymer electrolyte or a polymer gel electrolyte and may itself act as the separator. Alternatively, the electrolyte layer may comprise a semi-permeable or porous membrane acting as separator which is soaked with a small amount of liquid electrolyte. Such a semi-permeable membrane may, for example, be a tri-layer polymer laminate. The use of porous separators with liquid electrolyte is preferred for lithium-ion batteries to achieve high charging and discharging rates. Such liquid electrolytes usually consist of a lithium salt, for example, $LiBF_4$, $LiPF_6$ or $LiClO_4$, in an organic solvent, such as an organic carbonate.

The current collector layer inherently provides external electrical connectivity that can extend to the edge of the cell, thereby allowing current easily to be removed from the cell. However laminated structures with metal layers in conventional cells carry the risk of internal shorts. The present invention addresses this as described in more detail below.

A problem with some existing cells composed of pairs of current collector layers and laminated sheets joined/bound or sealed together is that layers which are of opposite polarity must be kept electrically isolated from one another. The electrolyte layer may extend to the cell periphery to achieve this and, for example, an electrolyte layer may be provided that is also capable of acting as an adhesive and that can form a seal with an adjacent laminated sheet. Polymer gel electrolytes are known and available that under heat and compression will sealingly bind to a laminated sheet. A pair of laminated sheets laid up as cell halves could therefore be calendared together with a polymer gel electrolyte to from a sealed cell. However such arrangements requires skill to ensure that heating is suitably controlled during the sealing process.

Depending on the cell chemistry selected, the electrically conductive layer may comprise a foil layer, a deposited or sprayed metallic layer or a printed metallic ink layer or any other non-porous, highly conductive material layer that is electrochemically stable in the chosen cell environment. It may be formed from copper, zinc, aluminium, platinum, silver or gold.

In the case of lithium-ion batteries, due to their sensitivity to water, an extremely efficient moisture barrier layer is required and the only materials capable of providing the required moisture permeation levels (lower than 1.10-3 g/m2/day) are metal layers. In a lithium ion cell, possible metals that are electrochemically stable on the respective sides include: Cathode side: Al, Au, Pt, Pd, Ti. Anode side: Cu, Fe, Cr, Ni, Mo.

Aluminium is a preferred material as it offers chemical resistance, low cost devices and is non-toxic. Similarly, nickel and cobalt offer less chemical resistance, are non-perishable and non-leaky. Typically with lithium ion chemistries an aluminium foil is used for cathode laminates and a copper foil for the anode laminates. The foils need to be thick enough to provide an adequate moisture barrier over the lifetime of the cell. Those skilled in the art will understand that optimum foil thickness will depend on the required service lifetime of the battery, with thinner laminates providing the best energy density, but with the trade-off of lower shelf lives. Similarly thickness of the polymer film and any adhesive layers is a trade-off between energy density and resistance to mechanical damage.

The laminated sheet may be a composite metal laminate, for example, a bonded foil laminate or a vacuum coated laminate. Bonded foil laminates are formed from one or more metal foils bonded to a polymer film using a suitable adhesive film; they are already used in flexible circuitry and have adequate barrier performance and conductivity, but can be less flexible than vacuum deposited laminates, although such rigidity may secure additional protection to a battery for some applications.

Vacuum deposited laminates tend to be lighter and more flexible, but more expensive and need careful manufacture to provide adequate barrier performance and conductivity.

A suitable vacuum deposited laminate would normally have a thickness range of 12 to 125 microns (this thickness being made up almost entirely of the polymer film substrate thickness chosen). Bonded foil laminates are likely to have a total thickness range of 50 to 230 microns depending on the laminate structure chosen. Typically the metal foil layer will be between 9 and 50 microns, the polymer layer between 12 and 125 microns. The laminate will usually have a mass per unit area of between 100-400 $g/m^2$, or even 100-200 $g/m^2$ where less barrier performance is required. The laminated sheet may consist only of an outermost polymeric layer and an innermost conductive layer, for example, a bonded foil laminate with only a single foil layer. A more preferred outermost protective layer for a bonded foil laminate is a polyimide, polyethylenenaphalate (PEN), or polyester layer.

The present cell construction is suitable for batteries or supercapacitors where a current collector layer acts as the electrode layer or, as is more common, supports the electrode layers. For example, the cell may be a non-aqueous, secondary, lithium-ion based battery, where both anodes and cathodes usually require current collector layers, or a lithium primary battery, for example, $LiCF_x$, or $LiMnO_2$ or $LiFeS_2$, where a lithium anode may be supported on a copper current collecting layer and a cathode layer supported on an aluminium cathode current collector.

In a lithium ion based cell using a bonded foil laminate, a preferred cathode collecting laminated sheet is laminated plastics (e.g. polyimide)/aluminium foil, while a preferred anode collecting laminated sheet is laminated plastics (e.g. polyimide)/copper foil.

The present invention additionally provides any novel feature or novel combination of features hereinbefore mentioned.

Figure 2A:
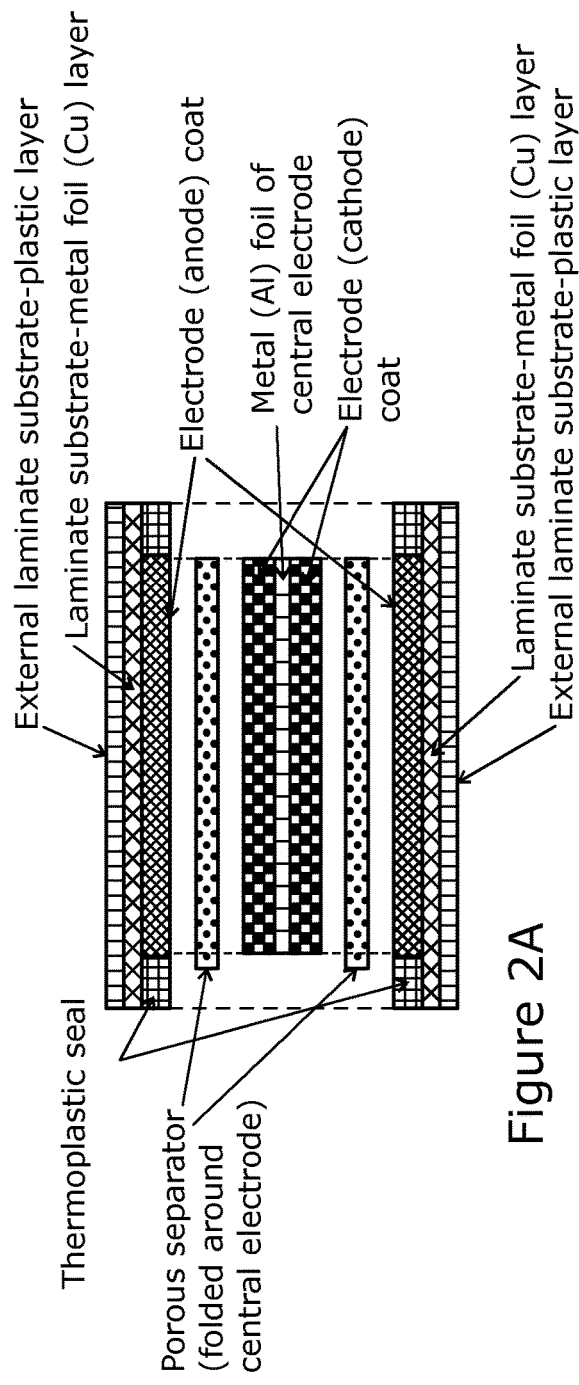
FIG. 2A and FIG. 2B are an exploded cross sectional view of the cell of FIG. 1.
Figure 2B:
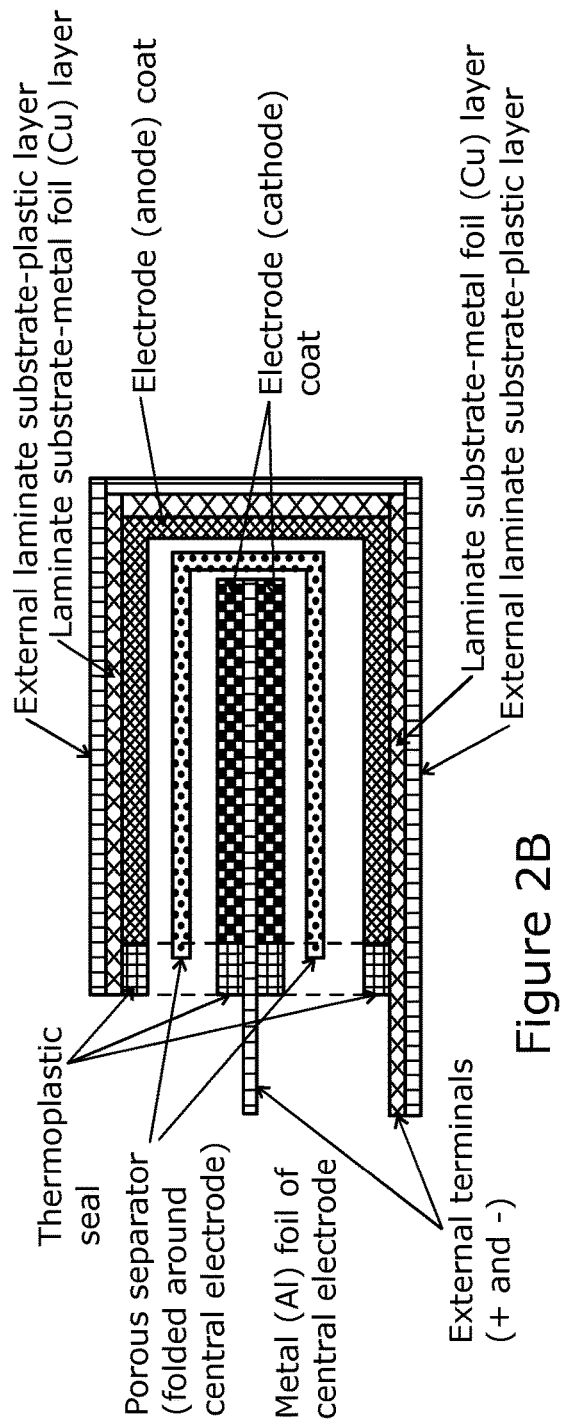

With reference to FIGS. 1 and 2, a bonded foil laminate, thin electrochemical cell, according to the invention is provided for use as a lightweight battery.

Lithium-ion battery technology was chosen for this example as it offers a high energy density for a rechargeable battery system. The chemistry requires a structure such that anode and cathode are separated by a porous separator, which is saturated with liquid electrolyte to enable transportation of charge between anode and cathode so that the cell can generate an electrical current. One or other of the anode or cathode can be printed using ink.

Cathode ink comprises a lithium cobalt oxide, carbon black as conductive additive, a co-polymer of polyvinyledene fluoride (PVDF) as the binder and n-methylpyrolidinone as the solvent. Anode ink consists of potato graphite and a co-polymer of polyvinyledene fluoride (PVDF) as the binder can be used. A liquid electrolyte consisting of lithium hexafluorophosphate ($LiPF_6$) in a solution of a mixture of ethylene carbonate (EC) and ethyl methyl carbonate (EMC) can be used.

Among suitable adhesives, a screen printable, UV curable, pressure sensitive adhesive from 3M can be employed. The selected adhesive can be UV cured to the optimum level of tack, prior to bonding using pressure. The advantage of a UV cured adhesive over a traditional solvent contact adhesive is that the correct level of tack can be maintained during heat drying in an oven prior to bonding in dry room conditions and allowing half cells to be fabricated outside of the dry room. Other suitable adhesives are thermoplastic adhesive layers.

Turning to the electrolyte layer, an electrically insulating, porous separator layer is provided between the anode and cathode material. It has to prevent the anode and cathode from electrically shorting and also store the liquid electrolyte that allows lithium ion transport between the electrodes. A commercially available extruded polymer film typically used in soft pack cells can be used as a separator and cut to the active cell shapes. Alternatively, a porous PVDF membrane separator layer can be applied by spraying a co-solvent mixture through a mask over the electrode structures.

Advantageously the internal electrode can be calendared, that is to say, fed between two steel rollers in order to compact the active material and increase its bulk conductivity and improve the interfacial resistance to electrolyte. The adhesive border can be printed at the required position(s) on the active electrode area. Then the adhesive is cured to the required state of tack.

With reference to FIG. 3, the performance of a cell prepared according to the methods in EP 2534713 and a cell of the invention were compared with the results as shown.

In particular it can be seen that there is improved weight and space saving, a more efficient footprint utilisation, a higher specific energy (16% improvement) and volumetric energy (5% improvement).

A further chemistry that could be used in the cells of the present invention is zinc/copper where by no active materials would need to be deposited at all. The copper would be contained in a copper/polymer laminate of the cathode and the zinc in a zinc polymer laminate of the anode.

It will be appreciated that various modifications could be made to the cell structures described above; still in keeping with the present invention and that although the above examples are based on lithium ion chemistry other suitable cell chemistries could also be used. Similarly to thin batteries, supercapacitors requiring electrode layers supported by current collectors could also be manufactured in accordance with the present invention.

The invention claimed is:

1. A method of preparing a thin flexible conformable electrochemical cell for powering a wearable electrical device, the method comprising:
    calendaring an inner electrode so as to reduce its thickness, wherein the inner electrode comprises an active electrode face of one charge and an outer electrode having an active electrode face of the opposite charge separated by a separator, wherein the separator comprises an electrolyte layer as a single continuous layer folded around the inner electrode; and
    sealing a single continuous flexible coating material around the separator and the inner electrode so as to offer protection for the cell, and wherein the coating material defines access to the cell for electrode contacts for connection with the electrical device, and so as to offer avoidance of the cell short circuiting in use.

2. The method of claim 1, wherein calendaring the inner electrode comprises feeding the inner electrode between two steel rollers.

3. The method of claim 1, wherein calendaring the inner electrode comprises calendaring the inner electrode to a thickness less than 0.6 millimeters.

4. The method of claim 1, further comprising:
    forming the separator by spraying a co-solvent mixture through a mask over the electrode structures.

5. The method of claim 1, further comprising:
    printing an adhesive border on the active electrode; and curing the adhesive to a required state of tack.

6. The method of claim 1, wherein calendaring the inner electrode increases its bulk conductivity or improves its interfacial resistance to electrolyte.

7. The method of claim 1, wherein the outer electrode has an uncoated region in a fold region to reduce thickness of the cell and to facilitate folding.

8. The method of claim 1, wherein the coating material offers moisture protection.

9. The method of claim 8, wherein the coating material is a polymeric layer.

* * * * *